E. M. WHITE.
INTERCEPTER FOR CRANK CASES.
APPLICATION FILED DEC. 26, 1916.
1,237,432.
Patented Aug. 21, 1917.
2 SHEETS—SHEET 1.
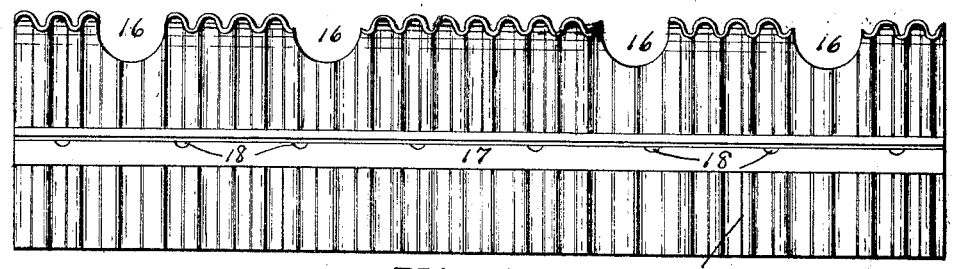
Fig. 3.
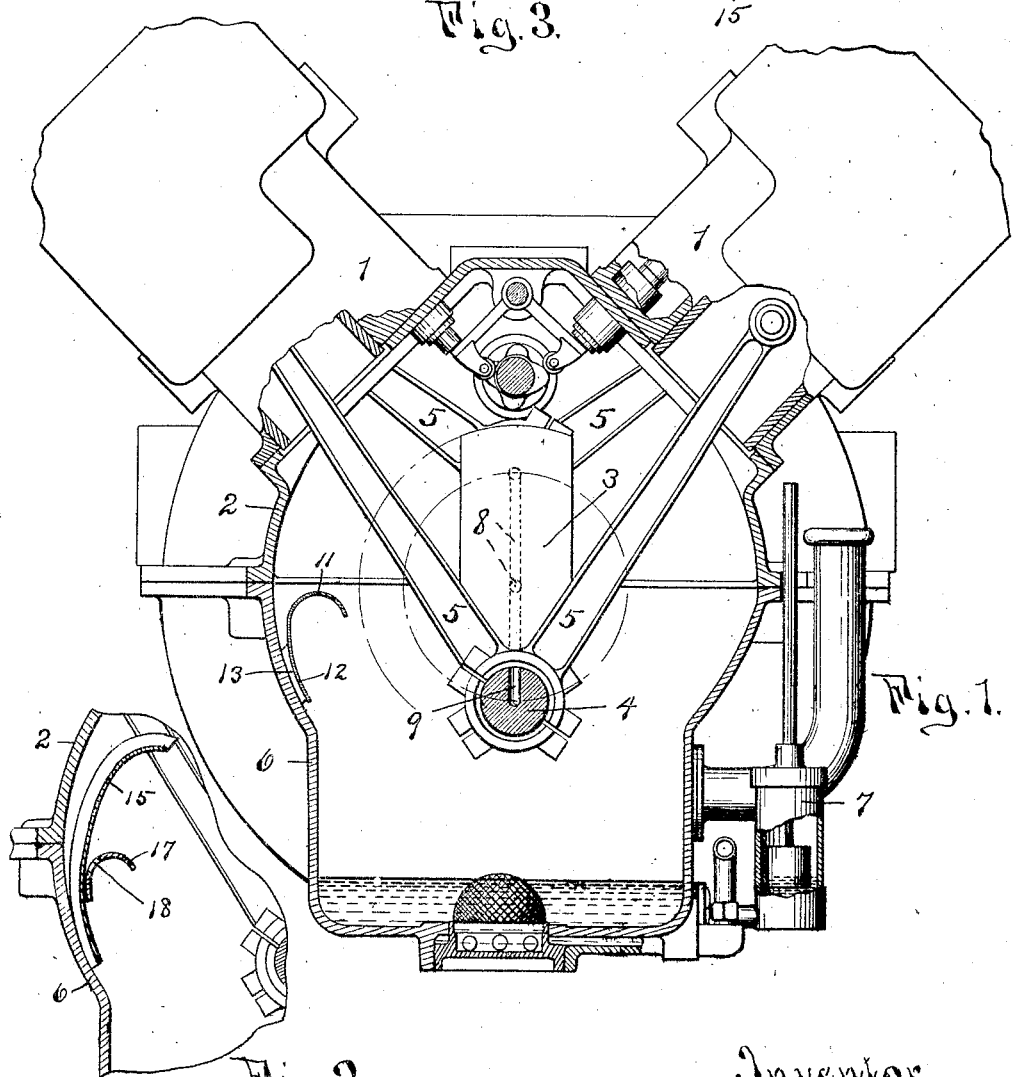
Fig. 1.
Fig. 2.
Inventor.
Ernest M. White.
By Pagelsen and Spencer.
Attorneys.

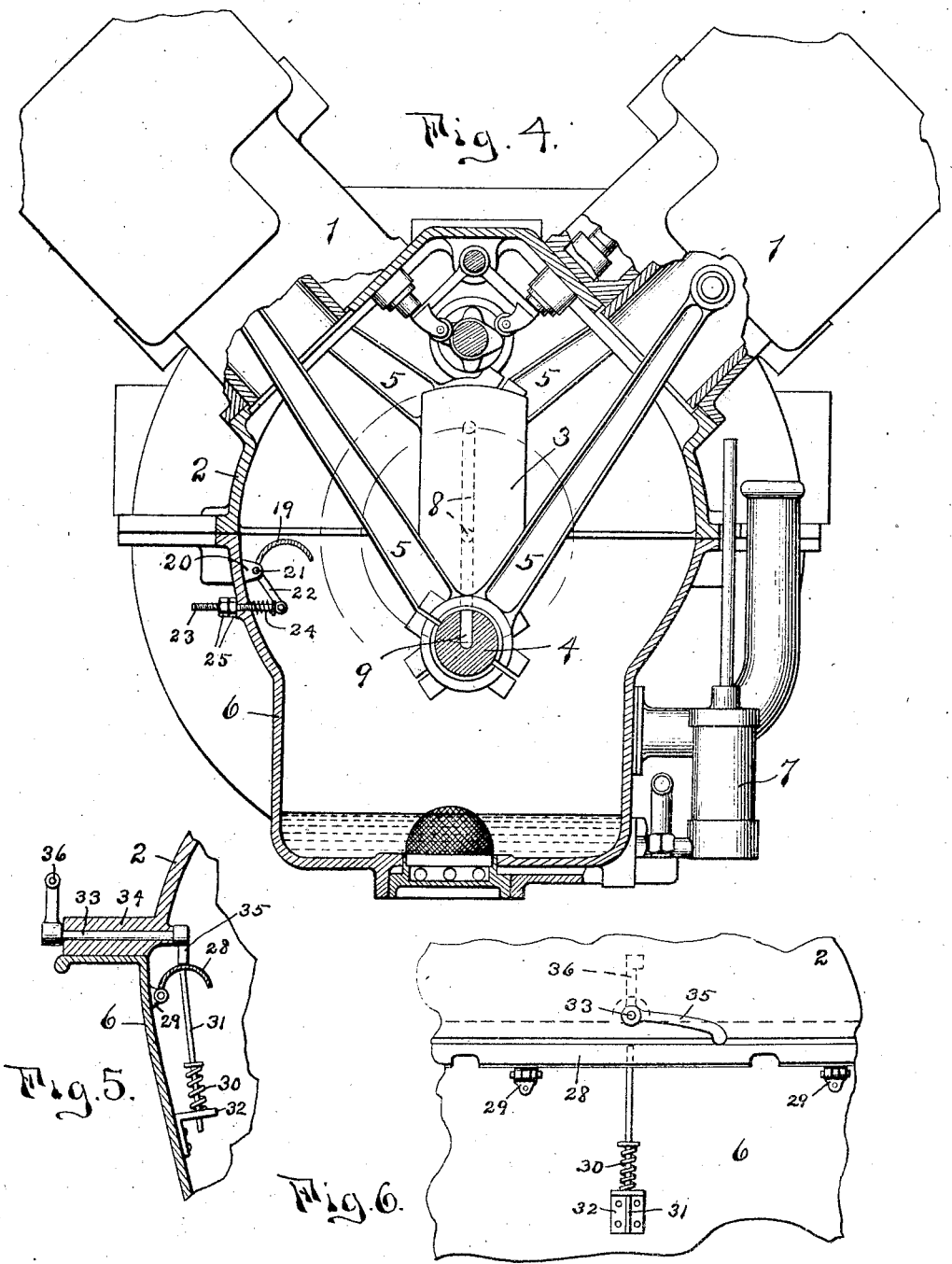

UNITED STATES PATENT OFFICE.

ERNEST M. WHITE, OF DETROIT, MICHIGAN.

INTERCEPTER FOR CRANK-CASES.

1,237,432.  Specification of Letters Patent. Patented Aug. 21, 1917.

Application filed December 26, 1916. Serial No. 138,951.

*To all whom it may concern:*

Be it known that I, ERNEST M. WHITE, a citizen of the United States, and residing at Detroit, in the county of Wayne and State of Michigan, have invented a new and Improved Intercepter for Crank-Cases, of which the following is a specification.

This invention relates to means for controlling the amount of lubricating oil thrown up into the bores of the cylinders by the crank shafts and connecting rods of internal combustion engines, and its object is to provide means whereby over-lubrication of the cylinders may be prevented by deflecting or intercepting a portion of the oil that is being carried around in the form of heavy mist and spray by the crank shaft and connecting rods of the engine, the lubricant being thrown out by centrifugal force into the cylinders.

This invention consists in an intercepter connected to one side of the crank case of an internal combustion engine and extending toward the crank shaft, and so positioned that the diameter of the drum of spray and mist of lubricating oil which is carried around by and thrown up from the crank shaft and the lower ends of the connecting rods may be varied and the amount of lubricant thrown out from the cranks and connecting rods may be controlled, and thereby the amount of oil which passes up into the engine cylinders may be properly regulated.

This invention further consists in adjustably mounting said intercepter so that its relation to the crank shaft may be varied according to the viscosity of the lubricant and the other factors that may enter into the problem of engine lubrication.

It will be understood that this invention is not limited to the combination of parts shown in the drawings and comprising a particular method or means for supplying the lubricant to the connecting rods, but broadly embraces novel means for intercepting a portion of the oil being thrown upward into the cylinders by the moving parts within the crank case.

It has been found in high speed internal combustion engines in which the moving parts are lubricated by means of oil splashed up by the lower ends of the connecting rods from receptacles below the crank shaft or by means of oil that is pumped through passages in the crank shaft, cranks and crank pins to the bearings, and thrown up into the cylinders by these moving parts, that a drum of mist and spray of oil is carried around by the crank shaft. This drum expands and portions of the mist fly out tangentially in all directions, portions passing up into the cylinders. In many engines, the amount of lubricant thus carried into the cylinders is so excessive that much oil is drawn up into the explosion chamber during the charging stroke of the engine, resulting in a heavy deposit of carbon, especially at the spark plugs. The engine is said to "pump oil". By preventing the unnecessary lubricant entering the cylinders, the efficiency of the engine is increased and the waste of oil is reduced to a minimum.

This control of the lubrication of the cylinders is accomplished by the construction shown in the accompanying drawings in which Figure 1 is a vertical transverse section of a multi-cylinder engine of V type provided with an oil intercepter embodying my present invention. Fig. 2 is a similar section of a modified form of the invention. Fig. 3 is an elevation, parallel to the crank shaft, of the intercepter shown in Fig. 2. Fig. 4 is a section similar to Fig. 1, showing an adjustable intercepter. Fig. 5 is a section of a modified form of adjustable intercepter. Fig. 6 is an interior elevation thereof.

Similar reference characters refer to like parts throughout the several views.

The engine shown in Figs. 1 and 4 is of a well known V type and is taken as an example of present engine practice. It must be understood, however, that the present invention may be made use of in any other type of engine, whether the lubricant for the connecting rods is forced through passages in the crank shaft, splashed up from receptacles in the bottom of the crank case, or provided in any other manner. Its cylinders 1 connect to the upper part 2 of the crank case and the crank shaft 3 has pins 4 on which the connecting rods 5 are mounted. The lower part 6 of the crank case acts as a storage reservoir for the lubricating oil which may be forced to the bearings by means of the pump 7 through the passages 8 and 9 in the crank shaft, or get there in any other desirable manner. At any rate, the lubricant is finally thrown out from the crank shaft in the form of mist and spray, a quantity of the mist in the form of a drum surrounding the crank shaft, from when a drum the mist is forced out by centrifugal force, part of it passing up into the cylinders. Larger drops are also thrown out from the moving parts.

In order to prevent a waste of oil, means are provided to prevent an excess of lubricant being thrown up into the cylinders, it having been found that regulation at this point is preferable to regulation by controlling the amount of lubricant passing to the crank case. The present device for thus regulating the amount of lubricant passing to the cylinders is an intercepter projecting from one wall of the crank case toward the crank shaft and so formed that it will serve to prevent the drum of oil mist from exceeding a predetermined diameter. This intercepter extends parallel to the axis of the crank shaft and is positioned below the top of the circles described by the centers of the crank pins.

In Fig. 1 this intercepter is shown to be formed of a strip of sheet metal, the upper portion 11 being substantially cylindrical while the lower portion 12 is secured at intervals to the lower portion of the crank case by means of small blocks 13. The lubricant that is thrown up against the upper portion of the crank case may run down between these blocks instead of accumulating on the top of the intercepter and flowing down into the drum of mist that is carried around by the crank shaft. As stated before, this drum expands under the action of centrifugal force and portions fly out at very frequent intervals. But by keeping down the diameter of this drum by means of the intercepter, the amount thus thrown out may be regulated within narrow limits, depending largely upon the character of the lubricant. The upper portion 11 of the intercepter may be bent toward or from the crank shaft in order to cut down or increase the amount of lubricant permitted to fly out from the crank shaft.

While the intercepter shown in Fig. 1 is usually effective for engines of the V type and engines having their cylinders in one plane, it may be necessary under extraordinary conditions to use an additional intercepter such as is shown in Figs. 2 and 3. The main body 15 of this intercepter is formed of corrugated sheet metal and may be provided with notches 16 to permit the lower ends of the connecting rods to pass through. The outer portions of the corrugations of this device may be spot welded to the crank case, thus leaving passages through which the lubricant may flow down to the bottom of the crank case. If desired, an additional intercepter 17 may be secured to the larger intercepter 15 and extend toward the crank circles to cut off a portion of the finely divided lubricant carried around by the cranks. Such oil as may be thrown against the intercepter 15 will pass through the holes 18 in the intercepter 17.

In these constructions, the metal of the intercepters must be bent in order to vary the supply of lubricant to the cylinders, which may be necessary when heavy lubricant is substituted for more mobile oil, or when the temperature and viscosity of the oil changes. In Figs. 4, 5 and 6, intercepters are shown provided with adjusting devices so that the distance the intercepter projects from the side wall of the crank case may be varied as desired.

In Fig. 4, the semi-cylindrical intercepter 19 is shown mounted on bearings 20 that receive the pins 21 carried by the intercepter. An arm 22 on this intercepter connects to the threaded rod 23. On the rod is a spring 24 that normally tends to swing the intercepter up away from the crank circle and the adjustable jam nuts 25 that resist the action of the spring. By turning these nuts on the rod, the amount of lubricant passing to the cylinder may be varied.

In Figs. 5 and 6, the intercepter 28 is shown pivoted on the small pedestals 29. A spring 30 presses the rod 31 up against the intercepter, a bracket 32 acting as an abutment for the spring and as a guide for the rod. A shaft 33 is mounted in a bearing 34 formed on the upper portion 2 of the crank case, and this shaft carries a lever 35 that engages the intercepter. Another arm 36 on this shaft may be connected to any desired operating mechanism such as the throttle of the engine or automatic mechanism that will cause the shaft 33 to turn and the intercepter to swing down or up according to the demand for lubricant for the cylinders.

While the lower sides of these intercepters are preferably concave, it will be understood that any other shape may be employed so long as it will regulate the amount of lubricant passing to the cylinders, the invention residing in the use of such intercepter and not in its particular form or location, or means of varying its position relative to the crank shaft.

I claim:—

1. The combination of a cylinder open at one end, a crank case in direct communication with the cylinder, a crank shaft therein, means to supply lubricating oil to the crank case which oil may be thrown into the cylinder by the crank shaft, and an intercepter attached at its lower edge to that wall of the cylinder toward which the crank pin moves when beginning to travel toward the cylinder and gradually sloping away therefrom, to intercept a portion of the oil thus thrown up.

2. The combination of a crank case and a cylinder in direct communication therewith, a crank shaft in the crank case, means to supply lubricating oil to the crank case which oil may be thrown directly into the cylinder by the crank shaft, and an intercepter connected at one edge directly to that side wall of the crank case toward which the crank pin moves when beginning to travel toward the cylinder, and extending substantially parallel to the crank shaft, said intercepter extending from said wall across the space between the wall and the crank shaft with its free edge nearer to the crank shaft than to said wall.

3. The combination of a crank case and a cylinder in direct communication therewith, a crank shaft in the crank case, means to supply lubricating oil to the crank case which oil may be thrown directly into the cylinder by the crank shaft, and an intercepter connected at one edge directly to that side wall of the crank case toward which the crank pin moves when beginning to travel toward the cylinder, and extending substantially parallel to the crank shaft, said intercepter extending from said wall across the space between the wall and the crank shaft with its free edge nearer to the crank shaft than to said wall, said free edge being formed with a notch to permit the passage of the connecting rod of the engine.

4. The combination of a crank case, a crank shaft therein, means to supply lubricating oil to the crank case which oil may be thrown out by the crank shaft, an intercepter projecting from one wall of the crank case toward the crank shaft to intercept a portion of the oil thus thrown up, means for pivotally supporting said intercepter, and means to vary the position of the intercepter.

5. The combination of a crank case and an open ended cylinder mounted thereon and in direct communication therewith, a crank shaft mounted in the crank case and a connecting rod attached to said crank shaft, means to supply lubricating oil to the crank case which oil may be thrown up directly into the cylinder by the crank shaft, and an intercepter secured at one edge to a wall of the crank case and extending into the path of the lubricant carried around by the crank shaft and formed with a notch to permit the passage of the connecting rod.

6. The combination of a cylinder and a crank case opening into each other, a crank shaft and a crank pin, means to supply oil to the crank case which oil may be mixed with air and carried around by the crank shaft, portions of said mixture being thrown up into the cylinder as the shaft revolves, and an intercepter secured to a side wall of the crank case and diverging therefrom to intercept a portion of the air and oil carried around by the crank shaft and so regulate the amount of lubricant thus thrown up into the cylinder, said intercepter being attached to that wall of the crank case toward which the crank pin moves when beginning to travel toward the cylinder.

7. The combination of a crank case, a crank shaft therein formed with passages for oil that is thrown out when the shaft revolves, and means adjustably mounted on a side wall of the crank case to intercept a portion of the oil thrown out by the crank shaft.

8. The combination of a crank case, a crank shaft therein formed with passages for oil that is thrown out when the shaft revolves, means adjustably mounted on a side wall of the crank case to intercept a portion of the oil thrown out by the crank shaft, and means for changing the position of the intercepter.

9. In an internal combustion engine of the V type, the combination of a crank case and two rows of cylinders mounted thereon at an angle to each other, a crank shaft mounted in the crank case and connecting rods attached to the crank shaft, means to supply lubricating oil to the crank case which oil may be thrown up directly into the cylinders of both rows by the crank shaft, and an intercepter secured at its lower edge to the wall of the crank case and diverging therefrom below the openings of that row of cylinders toward which the crank pins travel during the beginning of the compression strokes, to control the amount of oil thrown up into said cylinders.

10. In an internal combustion engine of the V type, the combination of a crank case and two rows of cylinders mounted thereon at an angle to each other, a crank shaft mounted in the crank case and connecting rods attached to the crank shaft, means to supply lubricating oil to the crank case which oil will be beaten into a mist and carried around by the crank shaft, portions being thrown up into the cylinder of both rows, and an intercepter secured at its lower edge to a wall of the crank case and diverging therefrom to intercept a portion of said oil mist, the free edge of the intercepter being a greater distance from said wall than the point of attachment.

11. In an internal combustion engine of the V type, the combination of a crank case and two rows of cylinders mounted thereon at an angle to each other, a crank shaft mounted in the crank case and connecting rods attached to the crank shaft, means to supply lubricating oil to the crank case which oil will be beaten into a mist and carried around by the crank shaft, portions being thrown into the cylinders of both rows, and an intercepter projecting toward the crank shaft to prevent an excess of lubricant being thrown into the cylinders of that row toward which the crank pins travel at the beginning of the compression strokes, said intercepter being notched to permit the passage of the connecting rods.

12. The combination of a crank case, a crank shaft therein, from which lubricating oil may be thrown up by centrifugal force, means to supply oil to the crank shaft, and an intercepter mounted on a side wall of the crank case to intercept a portion of the oil thrown out by the crank shaft, the edge of the intercepter being broken to permit uneven passage of the oil.

13. The combination of a crank case, a crank shaft therein from which lubricating oil may be thrown out by centrifugal force and by which a body of oil-mist may be carried around, means to supply oil to constitute said oil-mist, and means to control the diameter of the body of oil-mist carried around by the crank shaft, said means being positioned on the side of the crank case toward which the crank moves when approaching the cylinder and formed with openings to prevent the accumulation of oil thereon.

ERNEST M. WHITE